July 25, 1967 P. A. MUELLER 3,332,692
ROTARY MECHANICAL SEAL
Filed Jan. 26, 1965
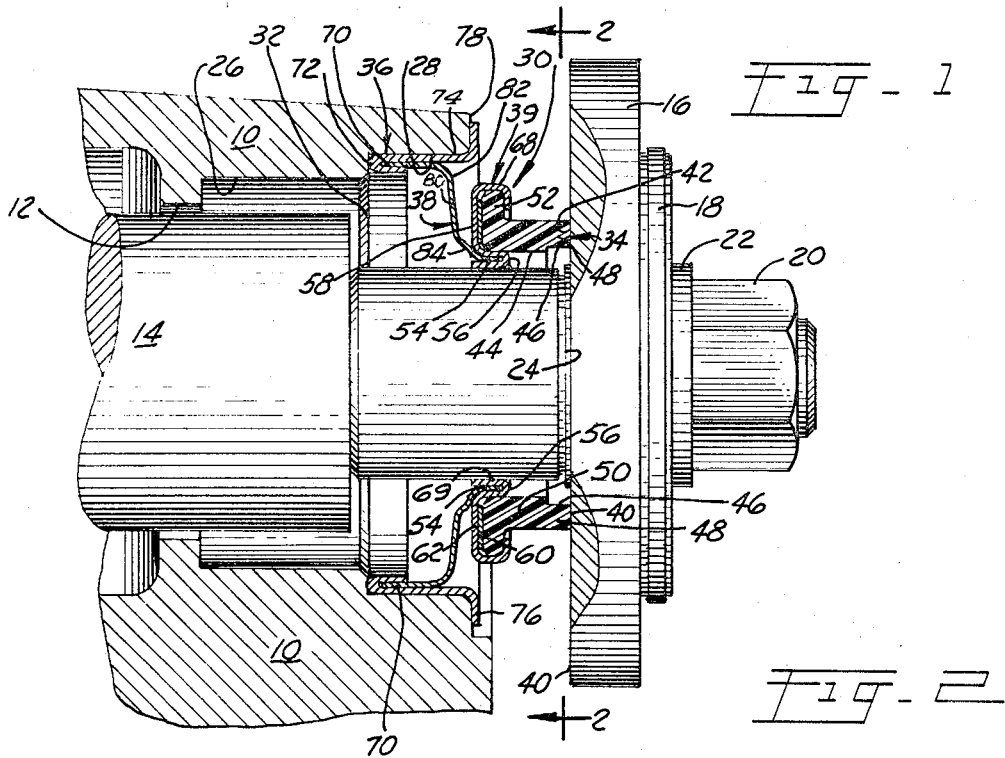
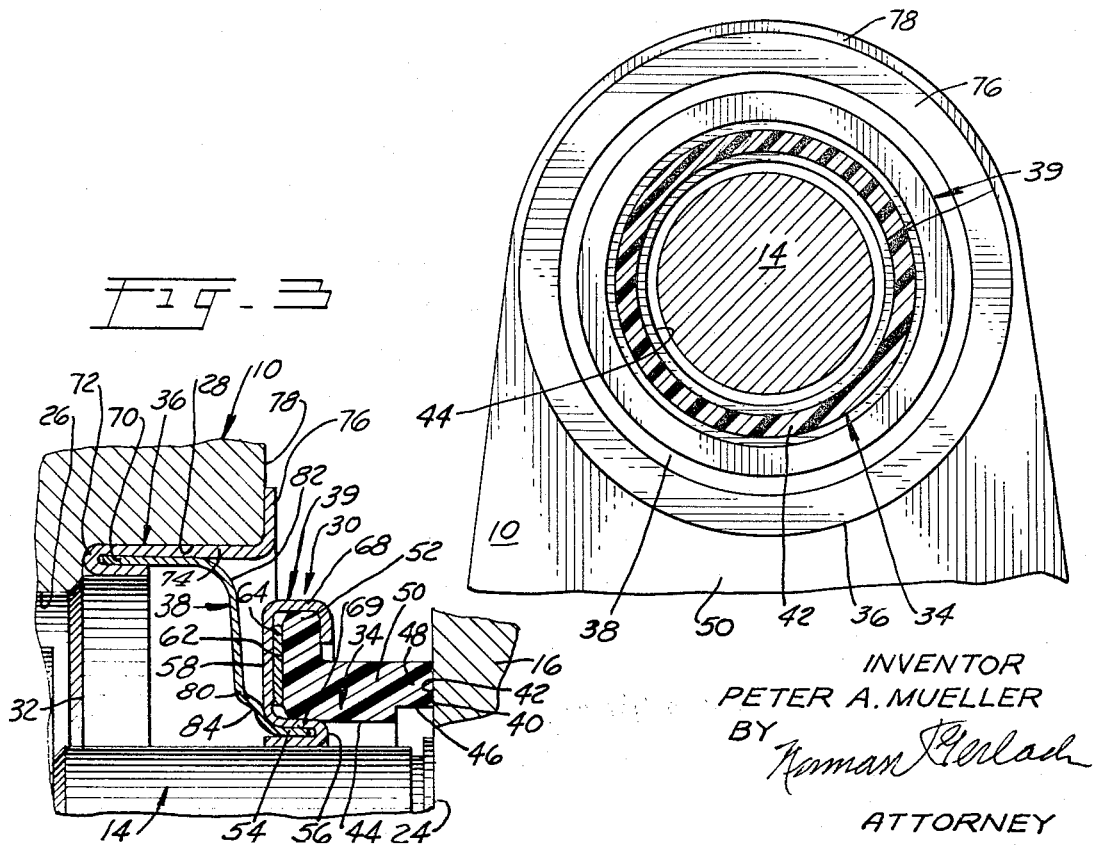
INVENTOR
PETER A. MUELLER
BY Norman Gerlach
ATTORNEY United States Patent Office 3,332,692
Patented July 25, 1967

3,332,692
ROTARY MECHANICAL SEAL
Peter A. Mueller, Oak Park, Ill., assignor to Mueller Seal
Company, Lyons, Ill., a corporation of Delaware
Filed Jan. 26, 1965, Ser. No. 428,023
7 Claims. (Cl. 277—42)

ABSTRACT OF THE DISCLOSURE

A rotary mechanical seal comprising an anti-friction washer, a generally frusto-conical backing ring formed of spring material and having one end thereof extending into the bore of the washer, and an assembly ferrule extending between and serving fixedly to connect the washer and ring and embodying a reentrant bight portion in straddled and crimped relation with said one end of the ring and an additional reentrant bight portion in straddled and crimped relation with a part of the washer.

---

The present invention relates to mechanical sealing devices and has particular reference to a rotary mechanical seal of the type which effects a seal against the passage of fluid between relatively rotatable machine parts such, for example, as the rotary shaft of an automotive water pump and the stationary portion of the pump casing through which the shaft extends. The invention is particularly concerned with that type of mechanical seal wherein the sealing effect between the relatively rotatable parts occurs at radially extending surfaces and a so-called running seal is provided between the relatively rotatable parts along an interfacial plane.

The opposed contacting running surfaces of a rotary mechanical seal of the type under consideration are usually provided on a pair of opposed sealing elements, one of which is commonly known as the seal seat and the other of which is commonly termed the sealing washer. In an automotive water pump seal, the washer usually is maintained stationary while the seat rotates in running sealing engagement with the washer. To attain this relationship, the seat is carried on the impeller shaft of the pump and rotates therewith while the washer is sealed to the wall of the pump casing opening through which the impeller shaft extends and is thus maintained stationary except for its ability to shift axially to compensate for combined washer and seat wear. In some installations, however, the seat may be press-fitted within the pump casing opening and the washer is carried by and rotates with the shaft and is spring-pressed toward the seat for the purpose of taking up wear. Whether the washer be maintained stationary while the seat constitutes the rotatable effective sealing element, or whether the reverse be true, it has heretofore been the practice, almost invariably, to employ elastic elements and helicoidal springs to maintain the necessary spring pressure between the parts for effective sealing and for wear take-up purposes. Where an elastic element, commonly termed a "bellows," is employed for sealing the washer to the wall of the pump casing opening, numerous adverse influences arise, both in the manufacture and assembly of the seal and as a result of operating conditions when the seal is put into service. One of these influences is the variable pressure of fluid on the bellows which affects sealing pressure at the interfacial plane between the rotating and stationary sealing elements.

It is an object of the present invention to provide a rotary mechanical seal employing a sealing washer which exerts a specific and predetermined pressure against its seat, this pressure being fairly constant during the life of the seal and independent of variations in fluid pressure, thus insuring satisfactory sealing at both high and low pressure differentials on opposite sides of the seal, as well as being independent of variations in the speed of the rotating element or part. In carrying out this object, the invention contemplates the provision of an all metal seal assembly which is devoid of an elastic element or bellows, as well as of helicoidal compression springs for forcing the washer against its seat.

Still more specifically, the invention eliminates the aforementioned bellows and spring combination and in its stead there is employed a single metal element in the form of an imperforate metallic ring of generally frusto-conical design, the ring serving the dual function of yieldingly urging the washer against its cooperating seat, and also of sealing the washer to the surrounding annular retainer which, in turn, is sealed to the wall of the casing through which the rotating shaft extends, the latter sealing means usually being in the form of a press-fit between the retainer and the wall.

It is a specific object to provide in a seal of the character briefly outlined above a novel means for effecting a torque-resisting sealed connection between the sealing washer and the small end of the generally frusto-conical sealing ring, as well as to provide a similar torque-resisting sealed connection between the washer and the retainer. In the case of the washer, the torque-resisting connection is made by means of a novel form of assembly ferrule which is crimped to both the washer and the sealing ring. In the case of the annular retainer, the latter is crimped directly to the sealing ring. This results in a four-piece metallic assembly, the parts being held together by the binding action of crimped parts and the assembly constituting a package-type unit which is capable of being installed bodily in an automotive water pump or other device for which the seal is intended or designed.

It is a further object of the invention to provide a package-type seal wherein the various constituent or component parts thereof assume nested positioned so that they consume but little space, particularly axial space, thus rendering the seal acceptable for use in a relatively short annular space.

It also is an object of the invention to provide a seal which, because of its small number of parts, may not only be manufactured at a lower cost but also is less likely to get out of order when in service.

Other objects and advantages of the invention, not at this time enumerated, will readily become apparent as the following description ensues.

In the accompanying single sheet of drawings forming a part of this specification, one illustrative embodiment of the invention has been shown.

In these drawings:

FIG. 1 is a fragmentary sectional view taken substantially centrally and longitudinally through a rotary mechanical seal constructed according to the present invention, certain parts being shown in elevation and other parts being broken away in order more clearly to reveal the nature of the invention;

FIG. 2 is a sectional view taken substantially along the line 2—2 of FIG. 1; and FIG. 3 is an enlarged radial sectional view taken through a portion of the structure shown in FIG. 1.

Referring now to the drawings in detail, the rotary mechanical seal of the present invention has, purely for exemplary purposes, been illustrated herein as being operatively installed in a recessed opening in an engine block, such opening having one end of a rotary engine shaft projecting axially therethrough. A fragment of the engine block is designated by the reference numeral 10, the opening by the reference numeral 12, and the shaft by the reference numeral 14. The shaft 14 is rotatably mounted in the usual bearings (not shown) and carries at its front or outer end a flywheel 16 having the usual power take-off belt and pulley arrangement 18. A nut 20 and a washer 22 serve to clamp the flywheel 16 against an annular should 24 on the shaft 14. The opening 12 is recessed by a first counterbore 26 which, in turn, is recessed by a second and larger counterbore 28, the rotary mechanical seal of the present invention being operatively installed in the second counterbore.

The rotary mechanical seal of the present invention is designated in its entirely by the reference numeral 30 and is provided for the purpose of preventing passage of oil or other liquid outwardly along the annular space 32 which exists between the recessed opening 12 and the shaft 14. The seal 30 comprises four principal parts, namely, a sealing washer 34, an annular retainer 36, a backing ring 38, and an assembly ferrule 39. The backing ring 38 is generally of frusto-conical design and has its small base fixedly secured to the washer 34 by means of the aforementioned assembly ferrule. The large base of the backing ring 38 is secured to the retainer by a crimping operation which is effected on the retainer in a manner that will be described presently. The washer 34 is adapted to make running sealing engagement with the rear or inside face 40 of the flywheel 16, this face being lapped to a flat condition and constituting a seat for the washer.

The washer 34 may be formed of various materials which have been found acceptable for sealing washer construction and among these materials are close-grained cast iron, brass, stainless steel and the like. One material which has been found particularly useful in the manufacture of a rotary mechanical seal for automotive use is a synthetic thermosetting resin containing a powered metal alloy of lead, antimony and tin. Under certain circumstances, especially where caustic liquids are involved, a ceramic material may be employed for the washer 34.

The washer 34 is in the form of an annular ring which loosely surrounds the shaft 14 and presents its running annular seal face 42 to the opposed seat-forming seal face 40 on the flywheel 16. The two seal faces are preferably lapped to an extremely high degree of flatness on the order of 0.0007, approximating to wave length of light so that they will exclude the entrance therebetween of liquid except in such minute quantity as to maintain lubrication of these faces for anti-squeal purposes.

The washer 34 is provided wih a central axial opening 44, the forward region of the opening being relieved as at 46 to provide a forwardly extending nosepiece 48 on which the previously mentioned seal face 42 is formed. The radial thickness of the seal face 42 is thus somewhat less than the radial thickness of the washer as a whole. The body portion 50 of the washer 34 is cylindrical and of appreciable axial extent. At its rear end the body portion 50 is provided with an integral outwardly extending continuous annular attachment flange 52 by means of which the washer 34 as a whole may be fixedly attached to the forward rim region 54 constituting the small base of the backing ring 38. The manner in which the washer 34 is attached to the forward rim region 54 of the backing ring 38 constitutes one of the principal features of the present invention, the attachment being effected by means of the novel assembly ferrule 39.

The assembly ferrule 39 is in the form of a ring which may be formed of brass or other suitable metal, and the inner peripheral region of this ferrule is crimped around the forwardly extending rim region 54 of the backing ring 38 by means of a tightly pressed reentrant bight portion 56. The rear portion or wall 58 of the assembly ferrule 39 extends in a radial plane immediately forwardly of the rear rim or end face 62 of the washer 34 and, preferably, but not necessarily, a thin gasket 64 is interposed between the rear wall 58 of the assembly ferrule and the rear rim or end face 62 of the washer. The gasket may be of paper-like fibrous material or it may be of an elastomeric nature. Under certain circumstances, the gasket may be formed of a plastic material such as "Teflon." The outer region of the assembly ferrule 39 is crimped around the outer periphery 66 of the attachment flange 52 by means of a wide but tightly pressed reentrant bight portion 68. After the assembly ferrule has been crimped about both the forwardly extending rim region 54 of the backing ring 37 and about the attachment flange 52 of the sealing washer, the bight portion 68 opposes one side of the bight portion 56 and, in effect, establishes a third reentrant bight portion which includes the rear wall 58 and is effective radially against the attachment flange 52 to hold the assembly ferrule securely on the washer. The first reentrant bight portion and the third reentrant bight portion have one leg portion 69 in common.

At the rear end of the large base of the backing ring 38, the retainer is tightly crimped to the rearwardly extending rim region 70 of said backing ring by means of a reentrant bight portion 72. The rear rim region 70 constitutes the large base of the backing ring. The body portion 74 of the annular retainer 36 is cylindrical and fits tightly within the large counterbore 28 of the opening 12 in the engine block 10. A radially extending annular seating flange 76 is formed on the front end of the retainer 36 and bears against the forward face 78 of the engine block 10, thus limiting the extent of reception of the retainer in the counterbore 28.

The backing ring 38, apart from its forwardly extending front rim region 54 and its rearwardly extending rear rim region 70 is, in the main, of frusto-conical configuration, the medial region 80 thereof being of extremely small slant height and having a large slant angle on the order of from 85° to 89°. At the large end of the cone this region 80 merges with the cylindrical rearwardly extending rear rim region 70 on a relatively large radius as indicated at 82, while at the small end of the cone there is provided a reverse bend 84 on a relatively small radius.

The backing ring 38 is formed of stainless spring steel and possesses an appreciable degree of resistance to axial end thrust so that the axial thrust exerted on the small end of the ring by the washer 34 and the assembly ferrule 39 when the seal is in service will cause flexing of the backing ring to only a slight degree.

In the operation of the seal, after the retainer 38 has been pressed into the counterbore 28 and the flywheel 16 has been installed on the shaft 14, the washer 34 will be yieldingly urged forwardly against the annular seat face 40 existing on the rear surface of the flywheel. With a newly installed seal, the backing ring 38 will be flexed to a slight degree as indicated and working pressure will be established between the two running seal faces 40 and 42. The tightness of the two crimped regions established by the bight portions 56 and 68 against the washer 34, coupled with the pressure that is exerted by these bight portions against the radial attachment flange 52 in a radial direction will prevent relative turning movement between the washer 34 and the backing ring 38. Stated otherwise, the assembly ferrule 39 will establish an effective "drive" between the washer 34 and the backing ring, albeit the washer in the illustrated environment for the seal is non-rotatable. A similar "drive" is established between the retainer 36 and the backing ring 38 by reason of the crimping of the retainer around the rear rim region of the backing ring.

During continued and prolonged operation of the seal, and as the nosepiece 48 consequently becomes worn, the backing ring 38 will continue to urge the washer 34 forwardly against the seat and thus take up wear. Although the backing ring 38 will, in its free state, present a definite but small slant height and a definite and large slant angle, when the seal is initially installed the flexing of the backing ring 38 may be such as almost entirely to eliminate any slant height and increase the slant angle to 90°. However, a potential slant height will nevertheless exist due to the resiliency of the backing ring and, after a period of wear on the nosepiece 48, the backing ring 38 will take on its normal frusto-conical aspects.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. In a rotary mechanical seal for sealing an opening in a housing wall and through which opening a rotatable shaft extends forwardly, an anti-friction washer having a cylindrical bore extending therethrough and adapted loosely to surround the shaft, said washer having a radially extending rear rim and in addition an annular forward end face designed for running engagement with a cooperating annular radial surface normal to and turning with the shaft, a thin flexible backing ring formed of spring material and having a forwardly extending cylindrical front rim region, a rear rim region, and a generally frusto-conical intermediate region with small and large ends, said front rim region extending loosely into said cylindrical bore through the rear end of the latter, and an assembly ferrule having a reentrant bight portion straddling said front rim region of the backing ring and crimped thereto coextensively therearound, and an additional reentrant bight portion straddling said rear rim of the washer and crimped thereto coextensively therearound, one leg of the additional bight portion bearing radially outwardly against said cylindrical bore and constituting a leg of the first mentioned bight portion, the rear rim region of said backing ring being provided with means for effective sealing engagement with the housing wall.

2. A rotary mechanical seal as set forth in claim 1 and wherein said front rim region is disposed at the small end of the intermediate portion of the backing ring and the rear rim region is disposed at the large end of said intermediate portion.

3. In a rotary mechanical seal for sealing an opening in a housing wall and through which opening a rotatable shaft extends forwardly, an anti-friction washer having a cylindrical bore extending therethrough and adapted loosely to surround the shaft, said washer having a radially extending rear rim and in addition an annular forward end face designed for running engagement with a cooperating annular radial surface normal to and turning with the shaft, a thin flexible backing ring formed of spring material and having a forwardly extending cylindrical front rim region, a rear rim region, and a generally frusto-conical intermediate region with small and large ends, said front rim region merging with the adjacent end of the frusto-conical intermediate region through a reverse bend of small radius, said front rim region extending loosely into said cylindrical bore through the rear end of the latter, and an assembly ferrule having a reentrant bight portion straddling said front rim region of the backing ring and crimped there to coextensively therearound, and an additional reentrant bight portion straddling said rear rim of the washer and crimped thereto coextensively therearound, one leg of the additional bight portion bearing radially outwardly against said cylindrical bore and constituting a leg of the first mentioned bight portion, the rear rim region of said backing ring being designed for effective sealing engagement with the housing wall.

4. A rotary mechanical seal as set forth in claim 3 and wherein said rear rim region is disposed at the small end of the intermediate portion of the backing ring and the rear rim region is disposed at the large end of said intermediate portion.

5. In a rotary mechanical seal for sealing an opening in a housing wall and through which opening a rotatable shaft extends, an anti-friction washer having a cylindrical bore extending therethrough and adapted to surround the shaft, a radially outwardly extending continuous attachment flange formed at the rear end of said washer, said washer having an annular forward end face designed for running engagement with a cooperating annular radial surface normal to and turning with the shaft, and an annular rear end face, a thin flexible backing ring formed of spring material, and having a forwardly extending cylindrical front rim region, a rearwardly extending cylindrical rear rim region, and an intermediate frusto-conical region, said front rim region projecting into the rear end of said cylindrical bore in the body portion of the washer, an assembly ferrule serving fixedly to secure the front rim region of the backing ring to the washer and including a first reentrant bight portion straddling said front rim region of the backing ring and crimped thereto coextensively therearound, a second reentrant bight portion straddling the radially extending attachment flange and crimped coextensively to the opposite sides thereof, and a third reentrant bight portion straddling the annular rear end face of the washer and crimped against the periphery of said attachment flange and the wall of said cylindrical bore in the washer, the rear rim region of said backing ring being designed for insertion into said housing wall with a pressed fit.

6. A rotary seal as set forth in claim 5 and including, additionally, a ring-like gasket interposed between said rear end face of the washer and said third bight portion.

7. In a rotary mechanical seal for sealing an opening in a housing wall and through which opening a rotatable shaft extends, an anti-friction washer having a cylindrical body portion provided with an axial cylindrical bore therethrough and adapted to surround the shaft, a radially extending continuous attachment flange formed at the rear end of said washer and projecting outwardly beyond the cylindrical confines of said body portion, said washer being provided with an annular forward end face designed for running engagement with a cooperating annular radial surface normal to and turning with the shaft, and with an annular rear end face, a thin flexible backing ring formed of spring material and having a forwardly extending cylindrical front rim region projecting into the rear end of said cylindrical bore in the body portion of the washer, a rear rim region and frusto-conical intermediate region, and an assembly ferrule having a first reentrant bight portion straddling said front rim region of the backing ring and crimped thereto coextensively therearound, and a second reentrant bight portion straddling the radially extending attachment flange and crimped coextensively to the opposite sides thereof, the rear rim region of said backing ring being designed for effective sealing engagement with the housing wall.

References Cited
UNITED STATES PATENTS

| | | | |
|---|---|---|---|
| 2,189,197 | 2/1940 | Cerny | 277—42 |
| 2,249,930 | 7/1941 | Bailey et al. | 277—42 |
| 2,382,960 | 8/1945 | Compton et al. | 277—42 |
| 2,392,998 | 1/1946 | Pross | 277—231 |
| 2,446,243 | 8/1948 | Reynolds | 277—95 |
| 3,203,704 | 8/1965 | Mueller | 277—42 |

SAMUEL ROTHBERG, *Primary Examiner.*